United States Patent [19]

Ball et al.

[11] Patent Number: 4,606,450
[45] Date of Patent: Aug. 19, 1986

[54] FRICTION CLUTCH DRIVEN PLATE

[75] Inventors: Robert J. Ball, Leamington Spa; Denzil J. W. Symonds, Warwick, both of United Kingdom

[73] Assignee: Automotive Products plc, Warwickshire, England

[21] Appl. No.: 709,924

[22] Filed: Mar. 8, 1985

[30] Foreign Application Priority Data

Mar. 9, 1984 [GB] United Kingdom ............... 8406198

[51] Int. Cl.⁴ .......................... F16D 3/14; F16D 3/77
[52] U.S. Cl. ............................ 192/106.2; 192/106.1; 464/68; 464/77; 464/160
[58] Field of Search ............ 192/106.1, 106.2, 55, 192/70.17; 464/64, 66, 67, 68, 77, 160

[56] References Cited

U.S. PATENT DOCUMENTS 1,751,228 3/1930 Bethel ................................. 464/77
1,997,021 4/1935 Spase .................................. 464/77
4,496,036 1/1985 Loizeau ........................... 192/106.2

FOREIGN PATENT DOCUMENTS 1475425 3/1970 Fed. Rep. of Germany .
2148286 4/1973 Fed. Rep. of Germany ... 192/106.2
2376333 7/1978 France .
2529982 1/1984 France .
118330 7/1983 Japan .
2123925 2/1984 United Kingdom ............... 464/66

Primary Examiner—Rodney H. Bonck
Assistant Examiner—David A. Testardi
Attorney, Agent, or Firm—Solon B. Kemon

[57] ABSTRACT

A friction clutch driven plate comprises an inner hub and a sleeve mounted on the inner hub for limited relative angular movement thereto by means of splines having clearance therebetween. Side plates secured to the hub are coupled through main torsion damping springs to a friction facing carrier having friction facings. The relative angular movement between hub and sleeve is controlled by two circumferentially extending springs which are arranged to be loaded in bending during this movement. To this end seats on the hub and on the sleeve engage against abutments on the springs. The springs are located in grooves of the hub and bear against end faces of the sleeve and so act as circlips to provide axial location between the hub and the sleeve.

9 Claims, 4 Drawing Figures

100
FRICTION CLUTCH DRIVEN PLATE

BACKGROUND OF THE INVENTION

This invention relates to friction clutch driven plates and particularly, but not exclusively, to driven plates which are utilised in the friction clutches of automobiles.

A problem associated with some automobiles is that during the periods when the transmission drive is under no load, rotary oscillations occur in the gearbox producing a phenomenon known as idle-rattle.

In order to damp out the vibrations which generate idle-rattle it is known to utilise a friction clutch driven plate in which the torque load through the driven plate passes through two sets of damping springs arranged in series with each other. Very light loads applied to the driven plate are taken through soft auxiliary vibration damping springing. When the limited angular movement controlled by the auxiliary damping springing has been taken up, normal drive load passes through a set of main torsion damping springs. In this way, very soft springing is provided over a limited range of movement for very light loads and this arrangement tends to prevent idle-rattle. Such a driven plate is known from French Patent Publication No. 1501465.

It is often important for a friction clutch driven plate to be compact in order to enable it to fit within a space available in an existing design of drive line or to assist in maintaining the combination of engine, clutch and gearbox as short as possible in a completely new design.

It is also desirable in the interests of reliability and cost to provide a design which is as simple as possible.

An object of the present invention is to provide a compact and simple design for auxiliary torsion damping springing in a friction clutch driven plate.

SUMMARY OF THE INVENTION

According to the present invention there is provided a friction clutch driven plate comprising an inner hub, a sleeve mounted on the inner hub for limited relative angular movement thereto and an annular friction member carried by the sleeve, wherein said relative angular movement is controlled by at least one circumferentially extending spring arm arranged to be loaded in bending during said movement, the spring arm or arms bearing against axial abutments of the inner hub and sleeve and acting as a circlip or circlips to provide axial location there-between.

Preferably there are two such springs, each arranged in a groove in an outer end portion of the inner hub, the sleeve extending between the springs and having abutments at its ends for engagement with the springs whereby the springs provide relative axial location in both directions.

Preferably each spring is formed of flat sheet material.

Preferably each spring is formed as an almost closed loop, both end portions of the spring being engageable against seats on the hub and sleeve.

Preferably each end portion of each spring has an abutment for the inner hub and an abutment for the sleeve, arranged so that for movement in one direction a seat of the inner hub lifts the abutment for the sleeve off its seat at one end of the spring and a seat of the sleeve lifts the abutment for the inner hub off its seat at the other end of the spring and vice versa for movement in the opposite direction.

Preferably the limited relative movement is provided by inter-engaging splines between the inner hub and the sleeve, with a circumferential clearance between the splines.

The friction clutch driven plate may incorporate main torsion damping springing arranged between the sleeve and the friction facing carrier and the spring controlled relative angular movement between the inner hub and the sleeve then acts as auxiliary torsion damping.

BRIEF DESCRIPTION OF THE DRAWINGS

An embodiment of the invention will now be described by way of example only with reference to the accompanying drawings in which.

DESCRIPTION OF A PREFERRED EMBODIMENT

Figure 3:
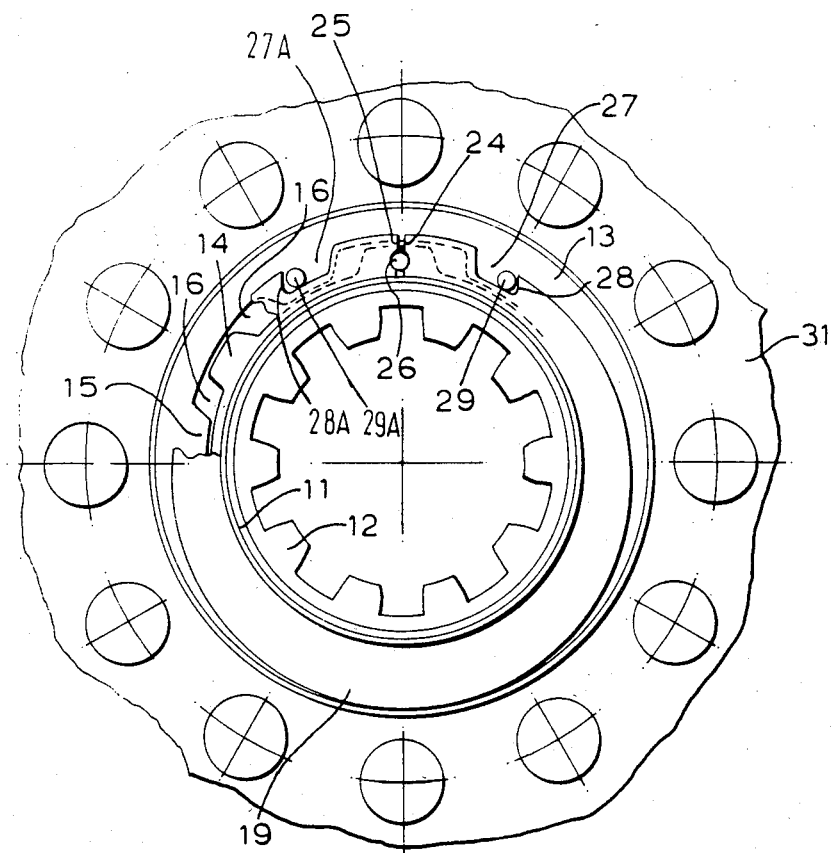
FIG. 3 an enlarged view corresponding to FIG. 1 showing the central region of the driven plate and with parts removed for clarity.

The friction clutch driven plate incorporates an inner hub 11 with internal splines 12 for mounting the driven plate on a gearbox input shaft. An outer hub member or sleeve 13 surrounds the inner hub 11. As seen in FIG. 3, the inner hub 11 also carries external splines 14 which engage with internal splines 15 of the sleeve 13 providing a driving connection between the inner hub and sleeve. Circumferential clearance 16 between the splines 14 and 15 allows limited relative angular movement between the hub 11 and sleeve 13.

The axial length of the hub 11 is greater than that of the sleeve 13 and near its outer end the hub is provided with annular grooves 17 and 18 within each of which is located a C-shaped spring 19 or 21. Springs 19 and 21 are generally flat being cut from sheet material and engage in grooves 17 and 18 in such a way as to act as circlips. The end faces 22 and 23 of the sleeve 13 act as abutments which bear against the springs 19 and 21 such that the springs provide relative location in an axial direction between hub 11 and sleeve 13.

Figure 1:
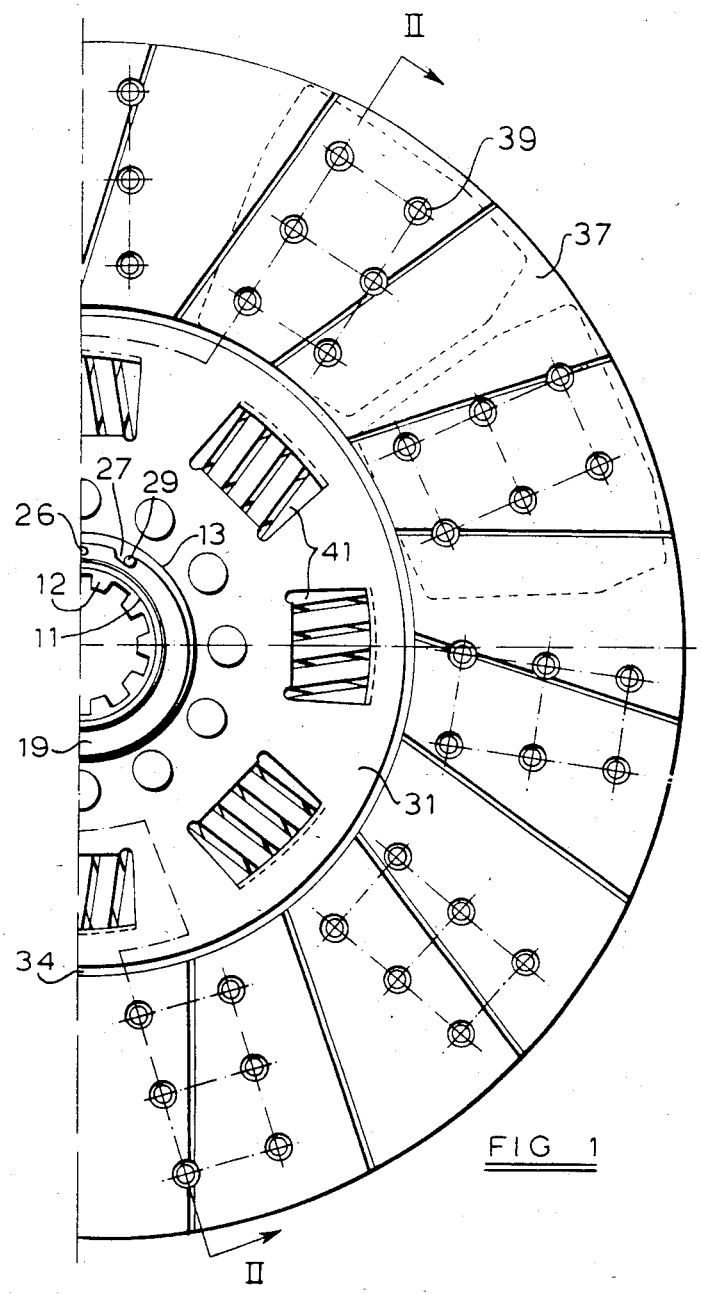
FIG. 1 is an axial elevation of one half of a driven plate.

As seen in FIGS. 1 and 3, each C-shaped spring almost forms a closed loop and the width of the spring tapers from a maximum diametrically opposite the opening to a minimum near the ends of the spring at the opening. The ends 24 and 25 of the spring act as abutments which bear against a seat formed by a pin 26 which is fixed within the hub 11. The end portions of each spring also incorporate notches 27, 27A set back a short distance from the end thereof and surfaces 28, 28A of these notches form abutments which bear against seats formed by pins 29, 29A fixed in the sleeve 13. During relative angular movement between the hub 11 and sleeve 13, pin 26 causes one end portion of the spring to move with the hub in one direction while one ofthe pins 29 constrains the other end portion to move with the sleeve 13. Slot 27 in the first mentioned end portion allows relative movement between spring and sleeve for that end portion. This movement of the end portions of the spring bends the spring and is resisted by the force of the spring. As the arrangement is symetrical, relative movement in the opposite direction is effected against the force of the spring, making use of the other abutments and seats.

Figure 2:
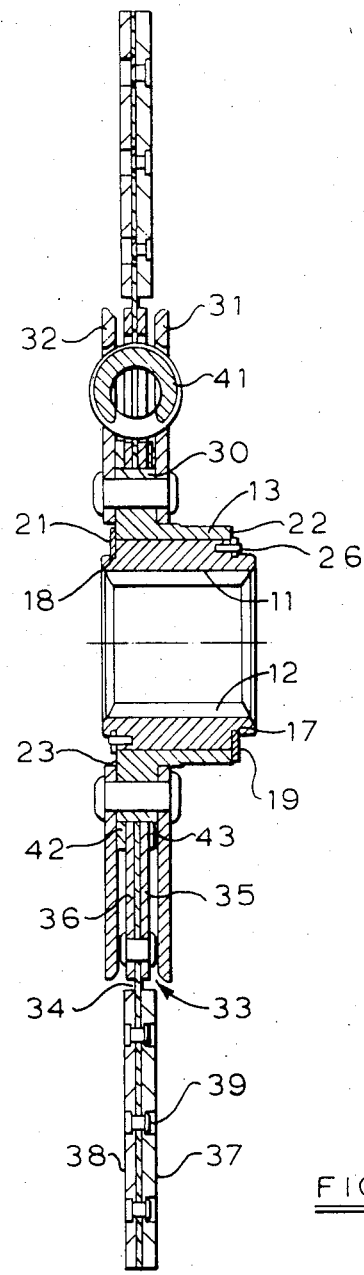
FIG. 2 is on line II—II of FIG. 1.

The outer part of the driven plate is also shown in FIGS. 1 and 2. Sleeve 13 incorporates an external flange 30 to which are rivetted two side plates 31 and 32. A friction facing carrier 33 constituted by a central steel disc 34 and two plates 35 and 36 rivetted one to each side thereof form a friction facing carrier. Friction facings 37 and 38 are secured to the carrier by rivets 39 and conventional axial cushioning may if desired be incorporated between the friction facings.

Drive from the friction facing carrier to an intermediate member constituted by side plates 31 and 32 and sleeve 13 is effected by main torsion damping springs 41 arranged in aligned windows in the carrier and side plates in the usual way. During the limited relative angular movement available between the friction facing carrier and intermediate drive member, the springs 41 are compressed and thus resist this movement. In this way springs 41 provide main torsion damping springing within the driven plate. Axial location and friction damping between the carrier and intermediate drive member are provided by friction washer 42 and corrugated annular spring 43 arranged one to each side of the carrier 33 and bearing against the side plates 32 and 31 respectively.

In use of the driven plate, drive is transmitted from the friction facings 37 and 38 to the inner hub 11 through the main torsion damping springing constituted by springs 41 and through auxiliary springing constituted by springs 19 and 21. When very low loads are being transmitted, for example during idling, springs 19 and 21 are effective to damp out torsional vibrations such as the phenomenon known as idle-rattle. When larger torques are being transmitted, the sleeve 13 drives hub 11 positively through splines 14 and 15 and torsional vibration damping is provided by the main torsion damping springing.

The driven plate just described is particularly compact in that very little space is required by the auxiliary torsional vibration damping springing. This auxiliary springing is also provided with the addition of a small number of simple and easily assembled components.

Figure 4:
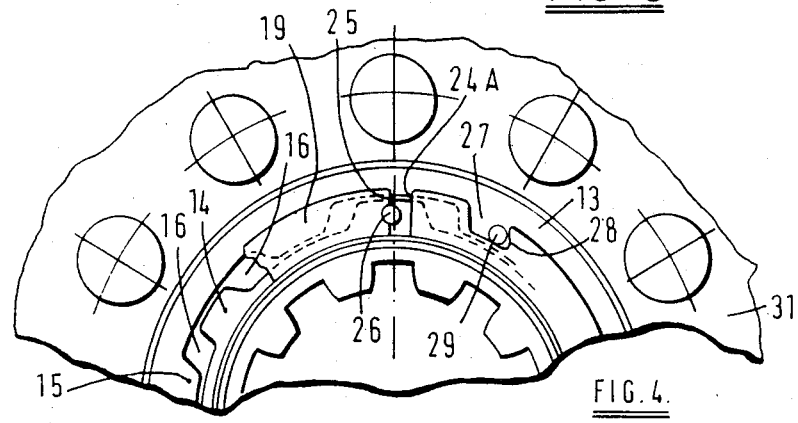
FIG. 4 corresponds to part of FIG. 3, showing a modification.

In a modification shown in FIG. 4, slot 27A with its abutment 28A and pin 29A are omitted. Also, the opposite end 24 of the spring is shortened to provide end 24A clear of pin 26 to avoid any pre-load on the spring. The effect of this modification is that the spring shown in FIG. 4 is effective in one direction only, that is rotation of the sleeve in a clockwise direction. Free movement in the opposite direction is permitted by spring 19 up to the limit of the length of slot 27 and the clearance between pin 26 and spring end 24A. At the opposite side of the hub, the corresponding slot, abutment and pin to provide control of rotation in the opposite direction may be deleted together with shortening of the opposite end of the spring. The effect then is that one spring controls rotation in one direction only and the other controls rotation in the other direction only. The absence of pre-nip in the springs prevents an undesired step in the torque/displacement characteristic, even if there is some overlap in the effective ranges of the two springs.

We claim:

1. A friction clutch driven plate comprising an inner hub, a sleeve rotatably mounted on the inner hub, means for limiting the relative angular movement between the hub and the sleeve, a friction facing carrier carried by the sleeve, means for controlling said relative angular movement comprising at least one circumferentially extending spring arranged to be loaded in bending during said movement, axial abutments on the inner hub and on the sleeve for each spring whereby each spring acts as a circlip to provide axial location between the hub and the sleeve.

2. A friction clutch driven plate according to claim 1 comprising two such springs, a groove in each end portion of the inner hub each receiving one of said springs, the sleeve extending between the springs and having abutments at its ends for engagement with the springs whereby the springs provide relative axial location in both directions.

3. A friction clutch driven plate according to claim 1 wherein each spring is formed of flat sheet material.

4. A friction clutch driven plate according to claim 1 further comprising seats for each spring on the inner hub and on the sleeve and wherein each spring is formed as an almost closed loop, both end portions of each spring being engageable against said seats.

5. A friction clutch driven plate according to claim 4 wherein each end portion of each spring has an abutment for the inner hub and an abutment for the sleeve, arranged so that for movement in one direction a seat of the inner hub lifts the abutment for the sleeve off its seat at one end of the spring arm and a seat of the sleeve lifts the abutment for the inner hub off its seat at the other end of the spring arm and vice versa for movement in the opposite direction.

6. A friction clutch driven plate according to claim 1 wherein the means for controlling the relative angular movement comprises inter-engaging splines between the hub and the sleeve, with a circumferential clearance between the splines.

7. A friction clutch driven plate according to claim 1 comprising main torsion damping springing operative between the sleeve and the friction facing carrier, the spring controlled relative angular movement between the hub and the sleeve acting as auxiliary torsion damping.

8. A friction clutch driven plate according to claim 1 wherein each spring has only one abutment engageable against a seat, in one direction, and only one other abutment engageable against a seat, in the other direction whereby said spring controls limited angular movement in one direction only.

9. A friction clutch driven plate according to claim 8 comprising two such springs, one arranged to control limited angular movement in one direction only and the other arranged to control limited angular movement in the other direction only.

* * * * *